United States Patent [19]

Button

[11] 4,231,162
[45] Nov. 4, 1980

[54] RANGE FINDER

[76] Inventor: Peter A. Button, P.O. Box 560578, 13010 SW. 85 Ave. Rd., Miami, Fla. 33156

[21] Appl. No.: 15,169

[22] Filed: Feb. 26, 1979

[51] Int. Cl.³ .............................................. G01C 3/00
[52] U.S. Cl. ........................................ 33/284; 33/274; 356/22
[58] Field of Search ................. 33/284, 274, 277, 278, 33/279; 356/22, 21, 20

[56] References Cited

U.S. PATENT DOCUMENTS

| 213,018 | 3/1879 | Watkin | 356/20 |
|---|---|---|---|
| 523,721 | 7/1894 | Fiske | 356/22 |
| 536,493 | 3/1895 | Wadsworth | 356/22 |
| 2,401,746 | 6/1946 | Castedello | 356/22 |

Primary Examiner—William D. Martin, Jr.

[57] ABSTRACT

An apparatus for determining the distance on the earth between (a) a point below an observation point at a known height, and (b) the base of an object of a known height. The apparatus includes a stadimeter having two pivots spaced from one another and two levers mounted for pivotal rotation with a mirror on each lever which face one another and are in parallel. An object height adjustment assembly is included which has a carriage with guide means and a member for movement perpendicular to the centerline of the guide and which member bears against the lever arm which tilts the lever arms upon movement of the member, the lever arms being biased into a normal position. Reference markings and a reader indicia are included.

13 Claims, 12 Drawing Figures

RANGE FINDER

FIELD OF THE INVENTION

An apparatus generally used to measure distance and more particularly an apparatus to measure distance on the earth between a point below an observation point at a known height and the base of an object of known height.

BACKGROUND OF THE INVENTION

In operation of a boat in coastal waters, large bays, and rivers, it is frequently desirable to ascertain one's position. This position can be determined by various means which include means independent of dead reckoning plotting or calculations which are subject to error caused by the lack of present knowledge of course, speed and current. The applicant's invention is of such nature. When operating a boat in waters such as those described above, various navigational land marks such as lighthouses, markers, chimneys, spires and tall buildings are often visible. These landmarks are shown on navigational charts of the local areas along with their heights above mean high water.

If two or more navigational landmarks are visible from the boat, the compass bearing of each may be obtained. When converted to true bearings this will yield lines of position which can be plotted on a chart. The intersection of two or more lines of position will give the desired position of the boat.

However, it frequently occurs that only one navigational aid is visible at a given time or, if two or more are visible, they are situated in such a manner that the angular cut of these lines of position will yield a rather large uncertainty in the position determination.

Under these conditions (single line of position) a fix may be obtained by measuring the distance from the boat to the navigational landmark. This will yield a circle of position whose intersection with the line of position, from the object, will result in the boat's position determination.

The distance from a navigational landmark may be measured by different methods. Electronic devices may be used, such as RADAR, but these are costly, bulky and power consuming and are seldom found on small or even moderate size boats.

Another method which can be used (and which is the principle of the instant invention) is to measure the angular subtense of the object (navigational landmark) from the boat and, by means of the appropriate mathematics, determine the distance.

This can be accomplished by means of a sextant which is an angle measuring device. However, to convert the angle measured by the sextant to distance requires special tables and mathematical manipulation which is somewhat laborious and time consuming and also subject to errors. To be specific, the sextant angle must be first corrected for the height of eye (dip table). Then the height of eye must be substracted from the height of the object. These two values are then used to enter Table 9 of H.O. Pub. No. 9 (Bowditch) or equivalent. Since there are two entering arguments, the calculation of distance will (in most cases) require a double interpolation—a time consuming process.

Another method of measuring the angular subtense of an object is by means of a stadimeter. This is an instrument, similar to a sextant, which is constructed so as to permit the user to read distance directly without having to resort to intermediate tables and computations. However, like the sextant, only one mirror is adjustable for the measurement. Because of the rather small angular subtense of most navigational objects (about one or two degrees at the most) this adjustment is extremely small and requires an accurate fine pitch screw which is somewhat costly. Also, most stadimeters are rather limited in range (3 to 5 miles) because their construction is based upon a flat earth. Any scaling to greater distances will result in significant errors due to the earth's curvature and atmospheric refraction.

The sextant, the available stadimeters and the instant invention all measure the angular substense of an object by the same method. This is accomplished by bringing into coincidence at the eye of the user the direct ray from one point (the base of the object or the visible horizon) and the double-reflected ray from the other point (the top of the object). The measured angular subtense is twice the angle between the two reflecting surfaces. In the case of the sextant and the available stadimeters, only one mirror is adjustable, the other being fixed. Here, the rotation of the single mirror is exactly half the angular subtense of the object. Since, in most cases, the object will subtend only one to two degrees or less, the adjustment of the mirror is quite small which requires high mechanical precision.

In the instant invention, the above is accomplished by means of a relatively simple device which is inexpensive and easily manufactured and accomplishes its objectives through movement of mirrors independent of one another with respect to one another. In this case, both mirrors are capable of rotation by means of a common adjustment mechanism. One mirror rotates a slight, but known amount greater than the other mirror. The eye sees two images, a direct and a double-reflected image. The object is then sighted through the instrument. The top of the object viewed through the double-reflected line of sight is made to coincide with the bottom of the object or the horizon viewed through the direct line of sight. This condition of conincidence is achieved by sliding the height adjustment mechanism back and forth as will be explained hereinafter. The mirror rotates through the angles alpha and beta, as which will be explained more fully hereinafter, until the resulting angle matches the angular subtense of the object. The distance of the object is then read directly from the distance scale.

OBJECTS OF THE INVENTION

Accordingly, an object of this invention is provide an apparatus where one can determine the distance from an object of known height.

Another object of this invention is to provide an apparatus wherein the angular subtense of an object may be compared with the angle from between the direct line of sight and the double-reflected line of sight of the object as viewed through two rotatable reflecting surfaces.

Another object of this invention is to provide a range finder which may be used to measure distances to an object where a portion of that object is not visible because it is below the horizon.

Another object of this invention is to provide an apparatus which is capable of measuring distance from an object of known height without the use of tables and reference material separate from the device.

Accordingly, another object of this invention is to provide an apparatus wherein the distance scales based upon different heights of a user's eye are interchangeable.

Another object of this invention is to provide a stadimeter wherein there are two rotatable mirrors.

Another object of this invention is to provide a stadimeter of giving distance directly from the distance over the horizon without resorting to charts, graphs, tables or the like.

Another object of this invention is to provide an apparatus wherein distance from an object of known height may be measured without the use of expensive means such as radar or the like.

Yet another object of this invention is to provide an apparatus wherein the construction, maintenance and operation of the apparatus are efficient, inexpensive, and accurate as well as being readily affordable by the average consumer.

In accordance with these and other objects which will become apparent hereinafter, the instant invention will now be described with reference to the accompanying drawings in which:

DESCRIPTION OF THE DRAWINGS

FIG. 8a shows the object viewed through the range finder when the object is before the horizon and out of focus, while FIG. 8b shows it in focus.

DESCRIPTION OF THE PREFERRED EMBODIMENT

Figure 1:
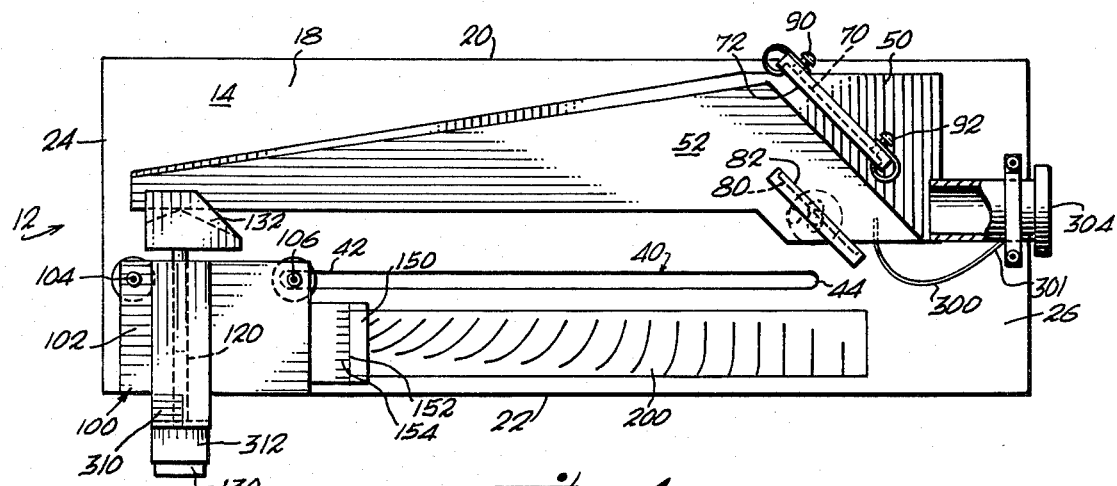
FIG. 1 is a top elevational view of the range finder.

Referring to the drawings where like reference characters designate like or corresponding parts throughout the several views and referring particularly to FIG. 1, there is shown the invention generally designated by the numeral 12 having a base 14 with a top surface 18. The base includes a top edge 20 and a bottom edge 22 with a first end zone 24 and a second end zone 26.

Figure 2:
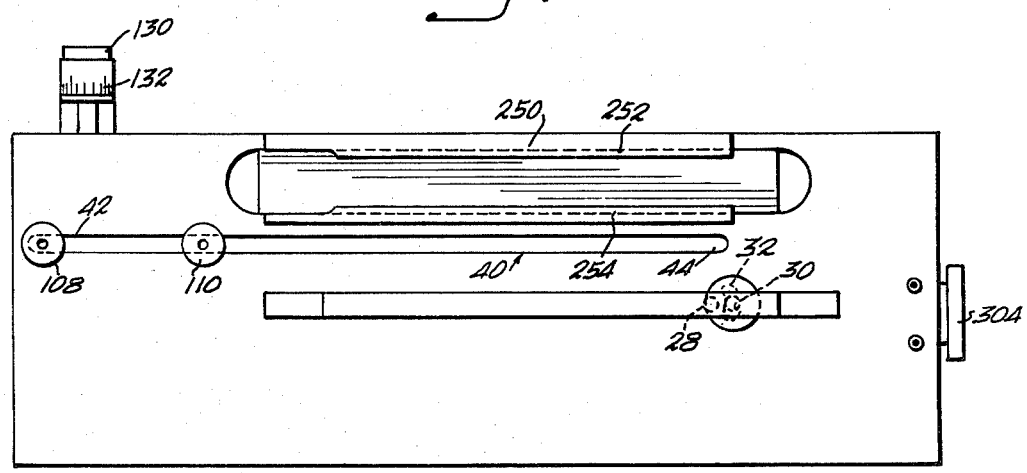
FIG. 2 is a bottom elevational view of the range finder.
Figure 3:
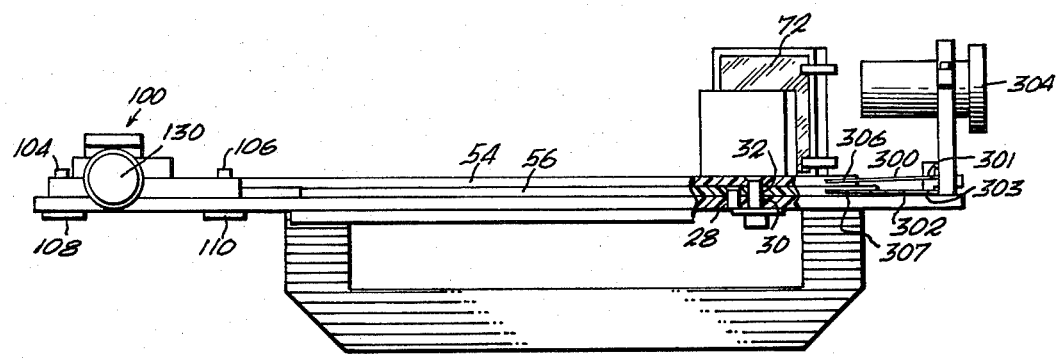
FIG. 3 is a side elevational view of the range finder.

As seen in FIGS. 2 and 3, the base defines two pivot holes 28 and 30; the first being an A mirror pivot hole and the second being a B mirror pivot hole. The bottom lever arm has a clearance slot 32 thereby allowing it to be rotated independent of the top arm.

With particular reference to FIG. 1, there is shown two lever arms 50 and 52. Each lever arm has a straight bottom edge 54 and 56 respectively. The first lever arm is pivotally mounted on the base in the A mirror pivot hole 28. The second lever arm is pivotally mounted in the B mirror pivot hole 30.

The instant invention includes two mirrors, an A mirror designated by the numeral 70 and a B mirror designated by the numeral 80. Each mirror includes a reflective surface 72 and 82, respectively. The A mirror is fixably mounted on the first lever arm 50 and the B mirror is fixably mounted on the second lever arm 52 thereto. It will be readily appreciated by those skilled in the art that the mirrors could be mounted any where along the lever arms as long as they are essentialy parallel to each other and their reflective surfaces confront each other.

Figure 7:
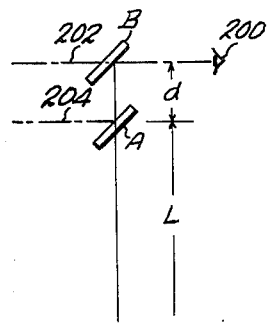
FIG. 7 shows the line of sight and double-reflected line of sight when the object height is at zero and the two mirrors are parallel.
Figure 6A:
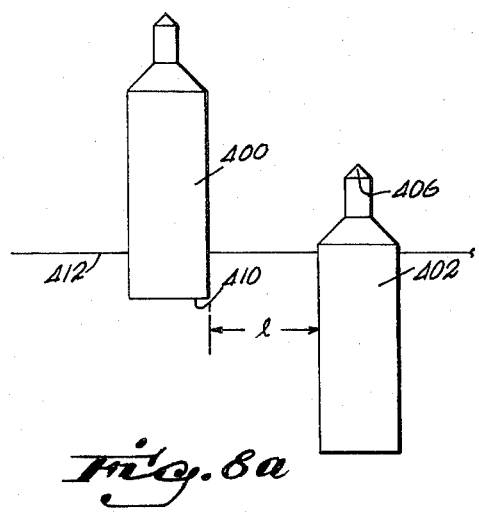
Figure 6B:
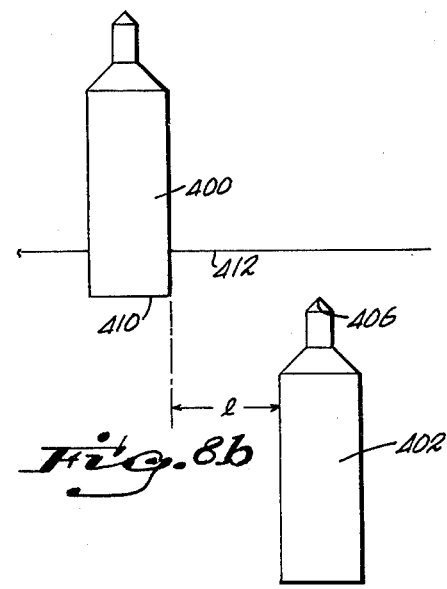

In the embodiment shown in FIG. 1, the A mirror includes means for adjusting the reflective surface. It will be readily appreciated by those skilled in the art that each mirror could have such means. The means for adjustment of the reflective surface in this embodiment comprises three (3) screws. Screw 90 adjusts the mirror parallel to one another such that the condition illustrated in FIG. 7 is achieved when the object height is set at zero as will be explained hereinafter. Two screws 92 set the distance 1 as illustrated in FIGS. 8 and 9 and to be explained hereinafter.

The base 14 includes a elongate track 40 having a first end 42 and a second end 44 for slidable interengagement with the height adjustment assembly mechanism generally designated by the numeral 100. The height adjustment assembly includes a carriage 102 having means 104 and 106 for slidably attaching the carriage to the elongate slot for slidable interconnection with the base. The means can comprise legs as in the embodiment shown in FIG. 3. At the end of each leg there is a lock washer 108 and 110, respectively. When the carriage is placed in the elongate track 40 the lock washers 108 and 110 are attached to legs 104 and 106. The height adjustment assembly is then placed within the slot 40 for slidable interconnection with the base and the carriage may move from the first end 42 to the second end 44 as shown in the embodiment depicted in FIG. 2. It will be readily apparent to one skilled in the art that the means for connecting the carriage to the elongate track may take various forms. The one illustrated in the embodiment shown in FIGS. 1 through 3 is merely one such form.

The height adjustment assembly 100 includes a member 120 mounted perpendicular to the center line of the elongate track. The member 120 is mounted on the carriage for movement perpendicular to the center line of the track. The member includes a first end 132 which bears against each of the lever arms 50 and 52 at their straight edges 54 and 56. The first end 132 can be in any form as long as the end bears against both lever arms. The member includes a second end 130 having an operator end whereby a rotation of the operator 130 causes a movement in the first end 132 and a corresponding increase or decrease of pressure on each of the lever arms 50 and 52 as shown in FIG. 4.

Figure 4:
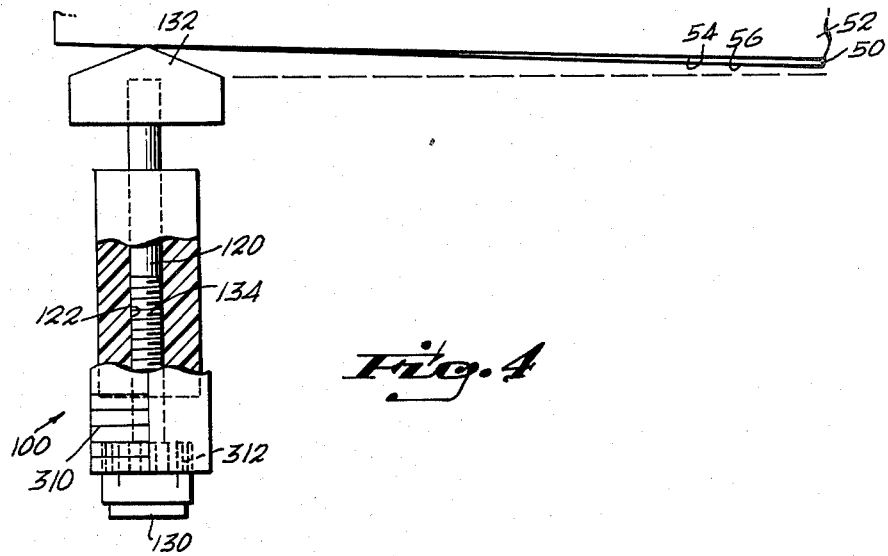
FIG. 4 is an enlarged fragmentary top view partially in section, illustrating the height adjustment assembly member bearing against the lever arms.

As is apparent to one skilled in the art, the member 120 may take various forms such as the embodiment in FIG. 4 wherein the member is mounted for movement within the carriage by means of the member having a middle portion 134 defining male threads and the carriage including mating female threads 122. Thus, as the operator 130 is rotated a predetermined amount, the first end 132 will bear against the lever arms with a corresponding increase or decrease in pressure. The base includes biasing means 300 and 302 for normally urging the lever arms into engagement with the first end of the member. The biasing means can be spring means such as shown in the embodiments of FIGS. 1 through 3 wherein the biasing means have a first end 301 and 303 respectively connected to the base and a second end 306 and 307 connected to the first and second lever arms respectively for normally urging the lever arms downward into contact with the member 120 and, more particularly, with the first end 132.

The member includes a first reference marking 310 having indicia in convenient increments of an object height such as 100 feet, 200 feet, etc. The operator end also includes reference indicia 312 and is incremented in various convenient increments of object height. As the member 120 is rotated, the increments of object height can be seen along the first reference markings 310 and read quite easily by the user. The threads of the member have a predetermined pitch and may have a particular pitch wherein the rotation of the operator end is proportional to a convenient increment of object height.

A distance scale such as 200 is placed adjacent the elongate track 40 and is calculated according to a predetermined equation which will be explained hereinafter.

Figure 10:
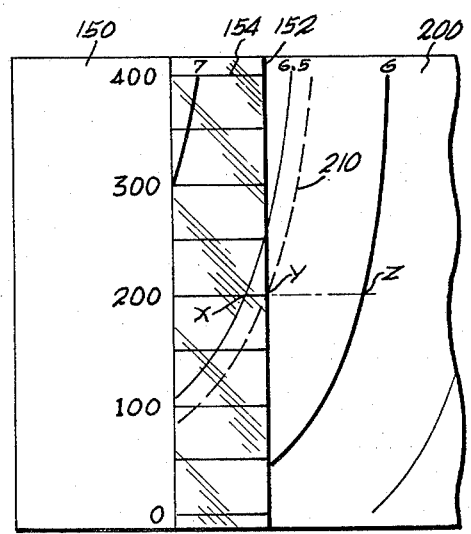
FIG. 10 shows a enlarged picture of the height adjustment reader scale and the distance scale.

The carriage includes a reader indicia 150 having a first reference line 152 and cross-reference indicia 154 perpendicular to the first reference line. As shown in FIG. 10, proper use of the reference line and a cross-reference indicia, as will be explained hereinafter, enable the user to accurately determine his distance from an object of known height.

Figure 5:
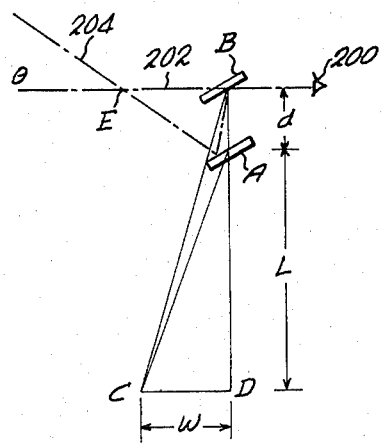
FIG. 5 shows the direct and double-reflected line of sight.
Figure 6:
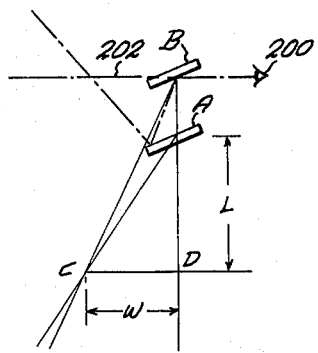
FIG. 6 shows the line of sight and the double-reflected line of sight when the mirrors are in a different position of rotation.

With particular reference to FIGS. 5 through 7, there is shown a schematic representation of the instant invention. With particular reference to FIG. 5, there is shown the B mirror mounted at point B on lever arm BC having a straight edge as shown. The A mirror is mounted at point A on lever arm AC with straight edge as shown. The lever arm is in contact with the object height adjustment assembly shown as W. The distance between the pivot points defines a line AB whose length is d. The object height adjustment assembly is capable of sliding movement as previously explained along line AD; defining a length L.

With particular reference to FIG. 7, there is shown the instant invention when the height adjustment mechanism is set at object height equalling zero and two mirrors are made parallel with their reflective surfaces facing each other via the adjustment screws 90 and 92. When the object height equals zero, the direct line of sight 202 and the double-reflected line of sight 204 form parallel lines, as shown.

With particular reference to FIG. 5, there is shown the direct line of sight 202 crossing the double-reflected line of sight 204 at point E and making an angle theta. As will be noticed in FIG. 7, angle theta does not exist because the double-reflected line of sight and direct line of sight are parallel to one another when the mirrors are in parallel alignment. The user's eye 200 shown in FIG. 5 through 7 views the B mirror and two images are visible as shown in FIGS. 8 and 9, a direct line of sight image and a double-reflected line of sight image. When the distance W is finite and at any position of L, the mirrors are rotated such that the double-reflected line of sight makes an angle theta with the direct line of sight. The lever arm AC and the elongate track AD form angle alpha while the lever arm BC and the line BD form angle beta. Under these conditions, the relationship theta equal two times (alpha minus beta) exists. It thus follows that the tangent of alpha equals W/L and the tangent of beta equals W/(L+d).

The angular subtense of the object is a function of the distance to the object D, the object height H, the height of the eye h, the radius of the earth R, and atmospheric refraction. Atmospheric refraction is a function of D, H, h, and the atmospheric constituents in their condition which cause refraction. An equation or set of equations may be written relating the parameters D, H, h, R, and refraction.

If the dimension W is chosen to be directly proportional to H, then for a given value of d and h, an expression relating D and L may be obtained. This may generate a distance scale which may be affixed parallel to line AD. The scale is calibrated in appropriate units such as nautical miles or the like. The scale may be offset parallel to AD with an index line affixed to the object height adjustment assembly mechanism to accommodate for this offset.

The object height adjustment assembly incorporates a screw as previously described which varies the dimension W. The screw is of a standard pitch and other instrument parameters are chosen such that one revolution of the screw corresponds to a convenient increment of object height. The operator end of the screw can be turned and adjusted manually and its circumference includes second reference indicia as previously explained.

IN USE

The invention is designed to be used in the following manner, although it is not the only manner in which it is capable of being used.

Firstly, the object height is set on the object height assembly mechanism 100. The object height is dialed in on the operator end 130 of the member by moving the second reference markings 312 to an appropriate intersection with the first reference indicia 310. The first end of the member 132 bears against the lever arms a corresponding amount according to the object height. The greater the object height, the more the first end 132 of the member bears against the lever arms 50 and 52 and consequently the more the mirrors are rotated.

After the object height is set correctly, the user views the B mirror through the eye-piece 301. It will be readily appreciated by those skilled in the art that the eye-piece is not necessary and that various means for viewing the ojbect could be used. For instance, the eye-piece could comprise a telescope, eye-tube, or any like optical means enabling the user to view the object.

With particular reference to FIG. 8a and 8b, there is shown the direct and double-reflected line of sight images in and out of alignment. The figure at the left, in FIG. 8a, represents the images out of alignment; and FIG. 8b, at the right, represent the images in alignment. The direct line of sight image 400 in the left figure of FIG. 8d is shown with the base 410 crossing the horizon 412. The second image at the right of FIG. 8d is the double-reflected line of sight image 402 which also breaks the horizon and is shown in the left figures out of alignment. In order to bring the images into alignment, the height adjustment mechanism slides along the elongate track 40 until the base of the direct line of sight image 410 and the top of the double-reflected line of sight image 406 are coincident, as shown in FIG. 8b.

After achieving the condition as shown in the second set of figures in FIG. 8b, the user uses the reader means 150 and the distance scale 200 to ascertain his distance from the object as will be explained more fully hereinafter.

FIGS. 8a and b show objects where the entire length is above the horizon. However, the invention may be used to ascertain the distance from the object even when the object is below the horizon as shown in FIG. 9a and b.

Figure 9A:
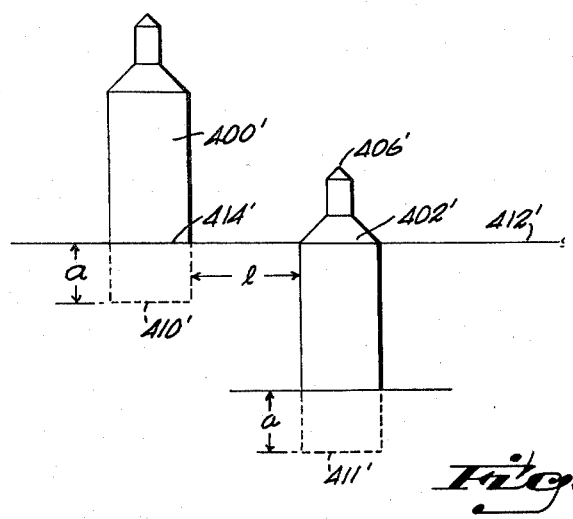
FIG. 9a shows the view through the range finder when the object is beyond the horizon and out of focus, while 9b shows it in focus.
Figure 9B:
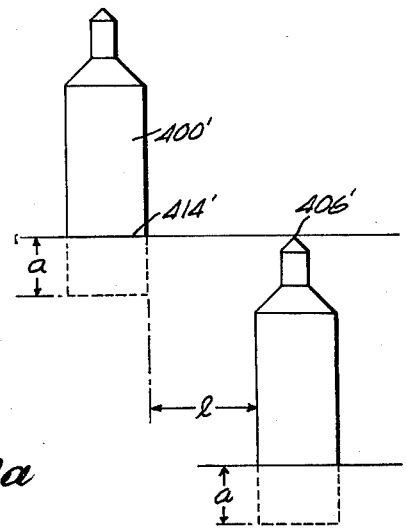

With particular reference to FIG. 9a there is shown two figures 400' and 402' it will be appreciated that the bottoms of each figure 410' and 411' are below the horizon 412'. However, a portion of the object 400' can be seen to intersect the horizon as at 414'. It will be readily appreciated that distance a, namely that distance the base 410' is below the horizon 412', equal the distance a of the double-reflected line of sight image 402'.

Approximately the same procedure is used to align the images as previously explained where the object is above the horizon. In this case, the top of image 402', 406' is aligned with the horizon and base portion 414' of the direct line of sight image. In order to ascertain one's position from the object when the condition existing in the second set of figures shown in FIG. 9 occurs, one merely reads the intersection of the reader indicia 150 with the distance scale 200 as will be explained hereinafter.

It will be readily appreciated that distance 1, the distance that the two images (double-reflected line of sight and direct line of sight) appears to be from one another, can be adjusted through the adjustment screws 92 on mirror A.

With particular reference to FIG. 10 there is shown the reader means 150 coincident with the distance scale 200. It will be readily appreciated that distance scale 200 may be attached through any means desirable. In FIG. 2 there is shown the distance scale attached through slidable means 250 which forms two enveloping edges 252 and 254 such that the distance scale can be slid directly into the slidable track formed therein.

After the condition shown in the second set of figures in FIGS. 8a and b 9a and b is achieved, the distance from the object may be ascertained. The user merely looks at the intersecting line which indicates the object height line and the distance curved line. By way of example, the following is typical of the way in which the distance from the object may be ascertained:

Suppose that the object height is 200 and one desires to determine the distance from the object, after the conditions shown in the second set of figure of FIGS. 8 and 9 has been achieved. The user merely extends the object height line 200 through point X and Z. It will be noticed that the only point at which the true object distance can be given is at point Y. However, no distance curved line such as 6 or 6.5 exists at that juncture. However, an extrapolated line 210 may be estimated.

It will be readily noticed that the distance from line 6.5 to point Y is XY and the distance from line 6.0 to point Y is YZ. The user now knows that he is between 6.0 and 6.5 units away from the object. After a comparison of the distance of XY and the distance YZ, it can be readily ascertained that the user is approximately 6.4 miles from the object. In a like manner, the cross-reference indicia 154 and the reference line 152 can be used for intersection with the various distance lines such as those at 210 for calculating the distance from the object.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed:

1. An apparatus for determining the distance on the earth between (a) a point below an observation point at a known height and (b) the base of an object of a known height, the apparatus comprising;
    a base having an A and B mirror pivot hole, said pivot holes being spaced from one another, a first and a second lever arms each having a straight bottom edge,
        the first lever arm being pivotally mounted to the base for swinging movement about the A mirror pivot hole, and
        the second lever arm being pivotally mounted to the base for swinging movement about the B mirror pivot hole,
    an A and a B planar mirror each having a reflective surface,
    the second lever arm including the B mirror and the first lever arm including the A mirror, the reflective surfaces of each of said mirrors facing one another and being substantially parallel,
    an object height adjustment assembly comprising, a carriage,
    the base including guide means defining an elongate track being a longitudinal center line and, means connected for movement along the track of the base,
    the carriage including a member having a first end perpendicular to the center line of the elongate track, means on the carriage captivating the member for movement perpendicular to the center line of the track, the first end of the member bearing against each of the lever arms for tilting the levers upon movement of the member, and biasing means on the base normally urging the lever arms into engagement with the member,
        the member having a second end comprising an operator means for moving the member, and including reference markings,
    an elongate previously calculated distance scale on the base adjacent the elongate track, and the carriage including reader indicia having a first reference line perpendicular to the elongate track, and the reader indicia further including a cross-referenced line perpendicular to the reference line and intersecting with the reference line.

2. The apparatus as set forth in claim 1 wherein the apparatus includes means for viewing the object.

3. The apparatus as set forth in claim 2 wherein the means for viewing the B mirror and object comprises an eye-piece.

4. The apparatus as set forth in claim 3 wherein the eye-piece includes a lower end fixably mounted to the base and adjacent the lever arms, and the biasing means comprises the spring means connected to the lower end of the eye-piece and each of the lever arms urging the lever arms normally against the carriage member.

5. The apparatus as set forth in claim 1 wherein the mirrors include means for adjusting each mirror's reflective surface.

6. The apparatus as set forth in claim 1 wherein the the first and second lever arms are mounted one over the other and the lower one has a clearance hole.

7. The apparatus as in claim 1 wherein the operator end of the member comprises screw means and wherein the guide means on the member includes threads.

8. The apparatus as set forth in claim 7 wherein the screw means has a predetermined pitch such that one screw rotation is proportional to a convenient increment of object height.

9. The apparatus as set forth in claim 6 wherein the distance scale may be placed offset from the nearest pivot hole and parallel to the line joining the two pivot holes and wherein the carriage mechanism includes a reference line at the same proportional offset to compensate for the distance scale offset.

10. The apparatus as set forth in claim 1 wherein the base includes means for holding the apparatus.

11. The apparatus as set forth in claim 1 wherein the base includes means for holding the distance scale.

12. The apparatus as set forth in claim 11 wherein the distance scale may be interchanged with another distance scale.

13. The apparatus as set forth in claim 1 wherein the member includes a second reference marking spaced a predetermined distance between the ends and the reader indicia includes furaher cross-reference indicia perpendicular to the reference line and intersecting with the reference line.

* * * * *